United States Patent [19]

Williamson et al.

[11] Patent Number: 5,187,709

[45] Date of Patent: Feb. 16, 1993

[54] FAULT TOLERANT SERIAL COMMUNICATIONS NETWORK

[75] Inventors: Gregory L. Williamson; Larry E. Kendrick, both of Peoria; Weldon L. Phelps, Dunlap, all of Ill.

[73] Assignee: Caterpillar Inc., Peoria, Ill.

[21] Appl. No.: 742,218

[22] Filed: Aug. 6, 1991

Related U.S. Application Data

[63] Continuation of Ser. No. 520,436, May 8, 1990, abandoned.

[51] Int. Cl.⁵ .............................................. H04J 3/02
[52] U.S. Cl. ................................. 370/85.3; 340/825.5; 370/85.15
[58] Field of Search .............. 370/85.1, 85.2, 85.3, 370/85.4, 85.5, 85.15, 85.12, 85.14, 60, 94.1, 16; 340/825.05, 825.5, 825.51

[56] References Cited

U.S. PATENT DOCUMENTS

| | | | |
|---|---|---|---|
| 4,063,220 | 12/1977 | Metcalfe et al. | 340/825.5 |
| 4,195,351 | 3/1980 | Barner et al. | 340/825.05 |
| 4,281,380 | 7/1981 | DeMesa et al. | 395/325 |
| 4,398,288 | 8/1983 | Mizokawa et al. | 370/15 |
| 4,412,326 | 10/1983 | Limb | 370/85.3 |
| 4,439,856 | 3/1984 | Ulug | 370/85.3 |
| 4,481,626 | 11/1984 | Boggs et al. | 370/85.3 |
| 4,503,533 | 3/1985 | Tobagi et al. | 370/85.3 |
| 4,530,085 | 7/1985 | Hamada et al. | 370/15 |
| 4,542,499 | 9/1985 | Bella et al. | 370/85.3 |
| 4,760,571 | 7/1988 | Schwarz | 370/85.5 |
| 4,763,321 | 8/1988 | Calvignac et al. | 370/94.1 |
| 4,815,069 | 3/1989 | Nakayashiki et al. | 370/16 |
| 4,850,043 | 7/1989 | Winston | 340/825.05 |
| 4,855,993 | 8/1989 | Hamada et al. | 370/16 |
| 4,860,006 | 8/1989 | Barall | 370/85.3 |
| 4,914,652 | 4/1990 | Nguyen | 370/85.5 |

*Primary Examiner*—Douglas W. Olms
*Assistant Examiner*—Dang Ton
*Attorney, Agent, or Firm*—Stephen L. Noe

[57] ABSTRACT

A communications network is adapted to provide communication between control modules on a vehicle. Each control module includes a first and second transceiver. A control module checks for the presence of a data message from another control module before transmitting a data message. If there is no other data message present, the control module transmits the data message around the network in both directions using the first and second transceivers. The other control modules receive the data message from the previous control module and pass the data message to the next control module in the network.

13 Claims, 10 Drawing Sheets

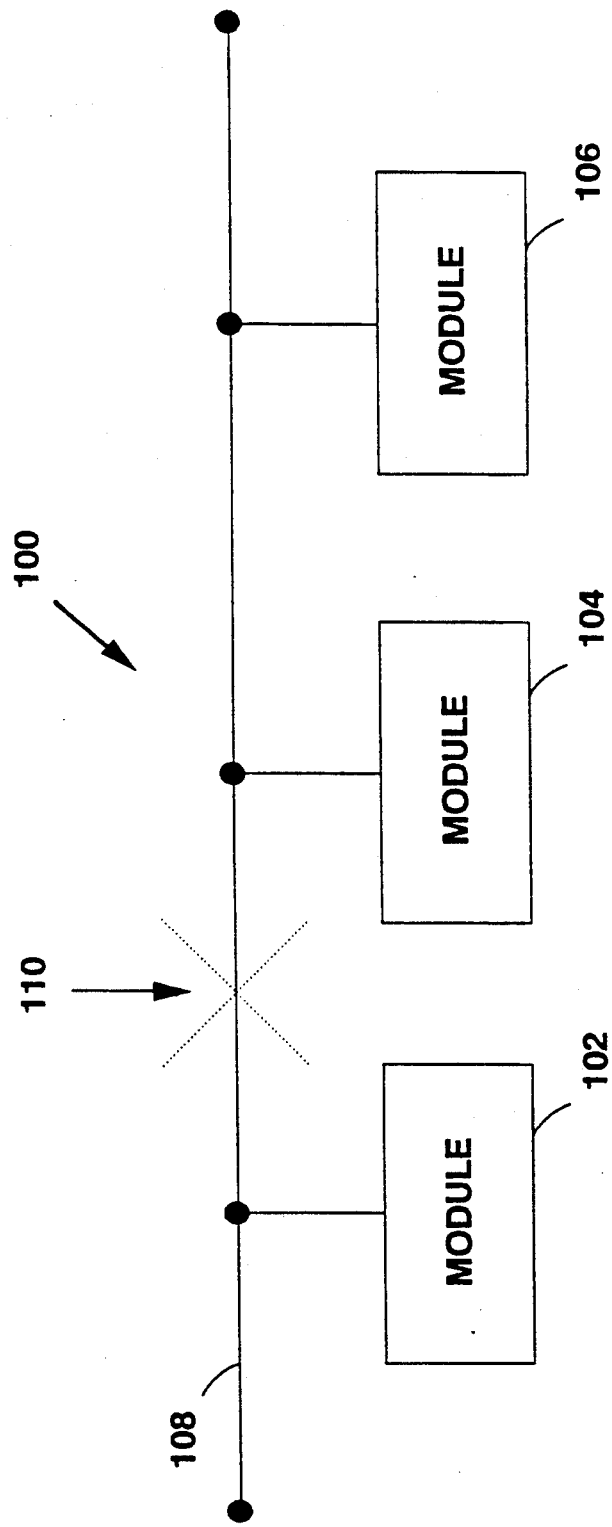
PRIOR ART

Fig_4_
PRIOR ART

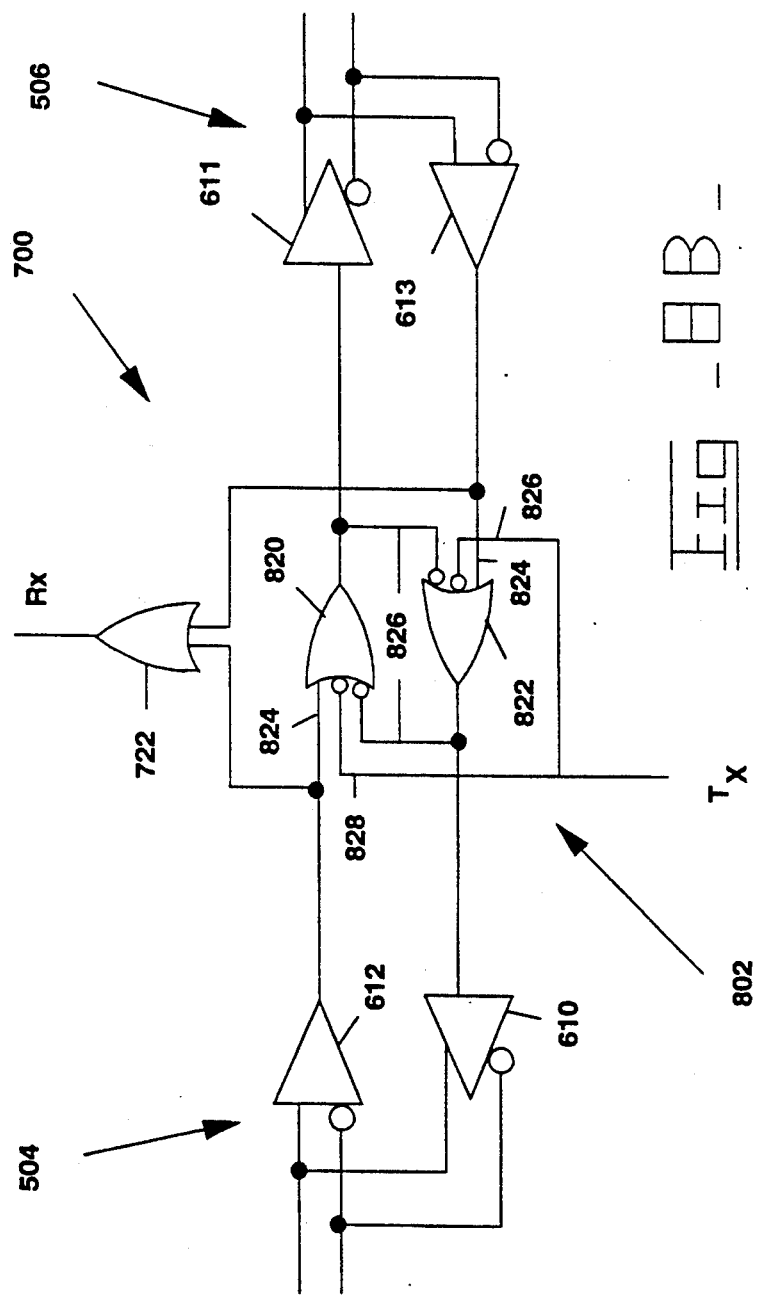

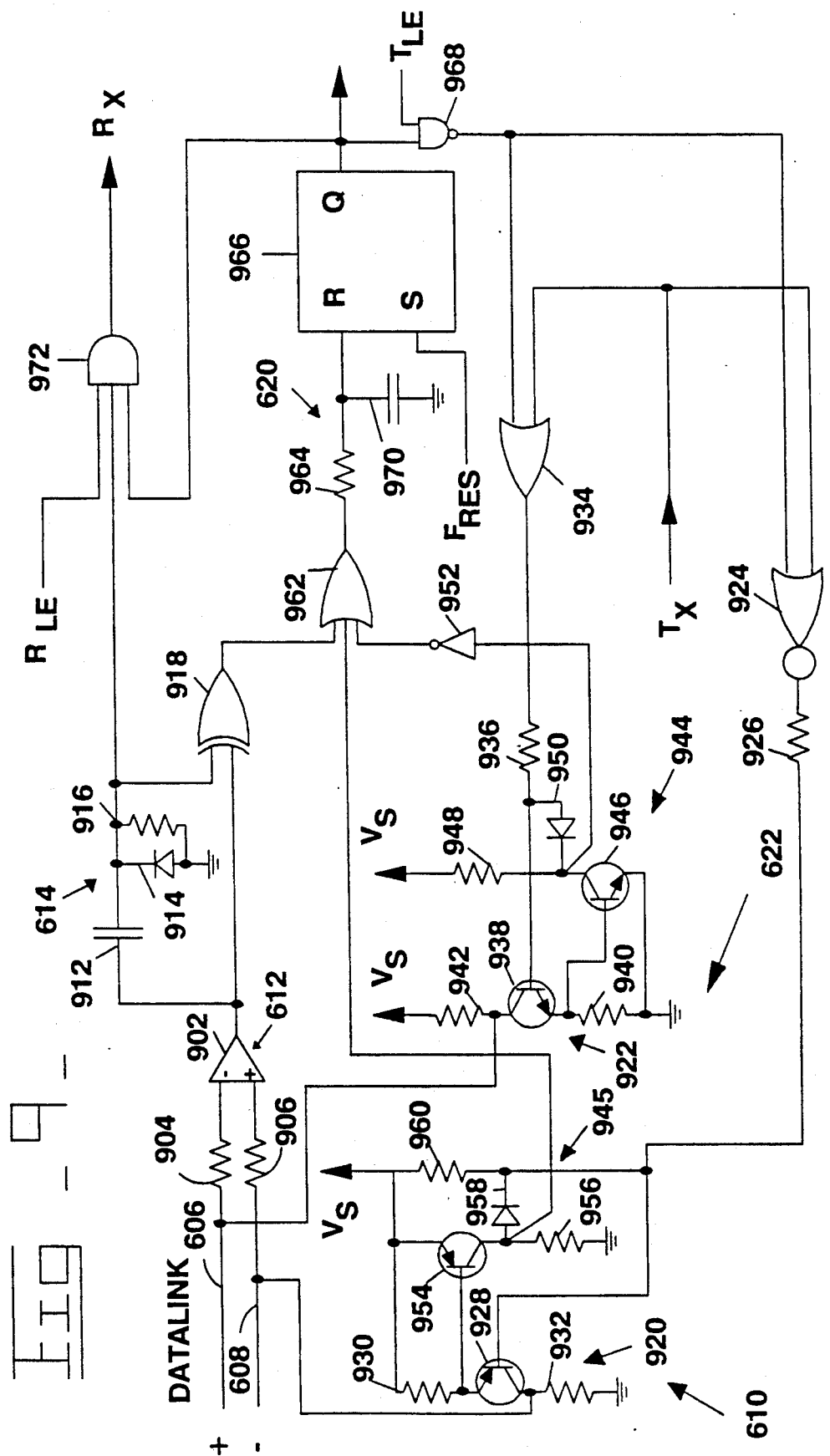

FAULT TOLERANT SERIAL COMMUNICATIONS NETWORK

This is a continuation of application Ser. No. 07/520,436, filed May 8, 1990, now abandoned.

DESCRIPTION

1. Technical Field

This invention relates generally to a bidirectional communications network having a ring configuration, and more specifically, to a network having a plurality of control modules in which data messages are generated and simultaneously transmitted through the network in two directions.

2. Background Art

With the use of intelligent control modules on a vehicle (for example, microprocessor based controllers), a system which provides cost effective and reliable serial communication between such intelligent modules has become increasingly important.

The need for communication between data terminals of a computer system resulted in development of the serial bus network. The data terminals or modules in a serial bus network are connected through a transmission line (or bus). Each module has a transmitter for putting data onto the bus and a receiver for reading data off of the bus. FIG. 1 shows a typical bus network 100. Each module 102,104,106 is connected to a bus 108. There are two associated problems with this type of bus network. First, a short circuit on the bus 108 disables communications between all of the modules 102,104,106. Second, if a break appears on the bus 108, communication between some of the modules 102,104,106 breaks down. For example, if there is a break 110 on the bus 108, as shown by the X in phantom lines, the module 102 to the left of the break 110 cannot communicate with the modules 104,106 to the right of the break 110 (and vice-versa).

In an attempt to provide a reliable communication system a bus ring network was developed. FIG. 2 illustrates a typical bus ring network 200. Modules 202,204,206 are connected by a bus 208, as in the normal bus network 100 described above, but the bus 208 is in the form of a ring. Thus, if there is a break on the bus 208, there is no loss of communications between any of the modules 202,204,206. The bus 208 simply provides another path for the transmission of data in the other direction. However, there is no way to detect the break or to determine the location of such a break. Also, a short circuit on the bus 208 still results in loss of communications between all of the modules 202,204,206. One such bus ring system is disclosed in U.S. Pat. No. 4,398,288 issued Aug. 9, 1983 to S. Mizokawa, et al.

The general ring configuration, as illustrated by the ring network 300 of FIG. 3, was designed to enable communication between the modules when a short circuit does occurs on the transmission line. As shown, each module 302,304,306 is connected to the previous module and to the next module by a separate transmission line. Each module contains a receiver 308A,308B,308C for receiving data from the previous module and a transmitter 310A,310B,310C for transmitting data to the next module in the ring. This configuration provides unidirectional communication around the ring. If a short or break appears on one of the transmission lines, communication can still occur between some of the modules 302,304,306. Unfortunately, since the transmission of data is in one direction, those modules that are behind the break cannot communicate to those modules that are in front of the break. For example, if a break 312 occurs between two modules 304,306, as shown by the X in phantom lines, the module 304 in front of the break 312 can transmit data to the other two modules 302,306, but cannot receive data from them. U.S. Pat. No. 4,760,571 issued Jul. 26, 1988 to S. Schwarz, discloses a ring network of this type.

As illustrated in FIG. 4, the redundant ring network 400, was designed to provide communication between all modules after the occurrence of a short circuit or an open circuit on a transmission line. Each module 402,404,406 includes two transmitter/receiver pairs 408,410. One transmitter/receiver pair 408A,408B,408C from each control module 402,404,406 provides communication around the ring in one direction using one set of transmission lines. The other transmitter/receiver pair 410A,410B,410C provides communication in the other direction around the ring using another set of transmission lines. This configuration provides bidirectional communication around the ring. In this manner, if a break or short occurs on the transmission line between two receiver/transmitter pairs 408A,408B,408C, communication can still occur between the two control modules utilizing the other receiver/transmitter pair 410A,410B,410C. This configuration, however, doubles the number of transmission lines needed. This adds unneeded cost. Also, in applications where communication is desired between modules in a harsh environment (for example, on a vehicle), electromagnetic noise is propagated by the transmission lines, hampering data transmission. Therefore, the number or total length of transmission lines is critical to ensuring reliable communication. U.S. Pat. No. 4,530,085 issued to T. Hamada et al. issued Jul. 16, 1985, discloses a typical redundant ring network.

The subject invention is directed at overcoming one or more of the problems as set forth above.

DISCLOSURE OF THE INVENTION

In one aspect of the invention, a communications network is provided. The network includes a plurality of control modules each having first and second transceivers. The first transceiver of each control module is connected to the second transceiver of another control module by only a single transmission line. The control modules form a composite ring network. Each control module transmits data messages to the other control modules over the transmission lines.

In another aspect of the present invention, a method for transmitting a data message around a ring communication network is provided. The network includes a plurality of control modules, each having first and second transceivers. The first transceiver of each control module is connected to the second transceiver of another control module. The control modules form a composite ring network. The method includes the steps of detecting the presence of a first data message on the network, producing a second data message at one control module, and transmitting the second data message simultaneously from the first and second transceivers of the one control module in the absence of the first data message.

BRIEF DESCRIPTION OF THE DRAWINGS

FIG. 1 is a block diagram of a serial bus network as known in the prior art;

FIG. 8B is a block diagram of the transceivers of one control module showing a second embodiment of the pass-through means; and FIG. 9 is an electrical schematic of an embodiment of the transceiver and fault diagnostic hardware, according to the present invention.

BEST MODE FOR CARRYING OUT THE INVENTION

Figure 2:
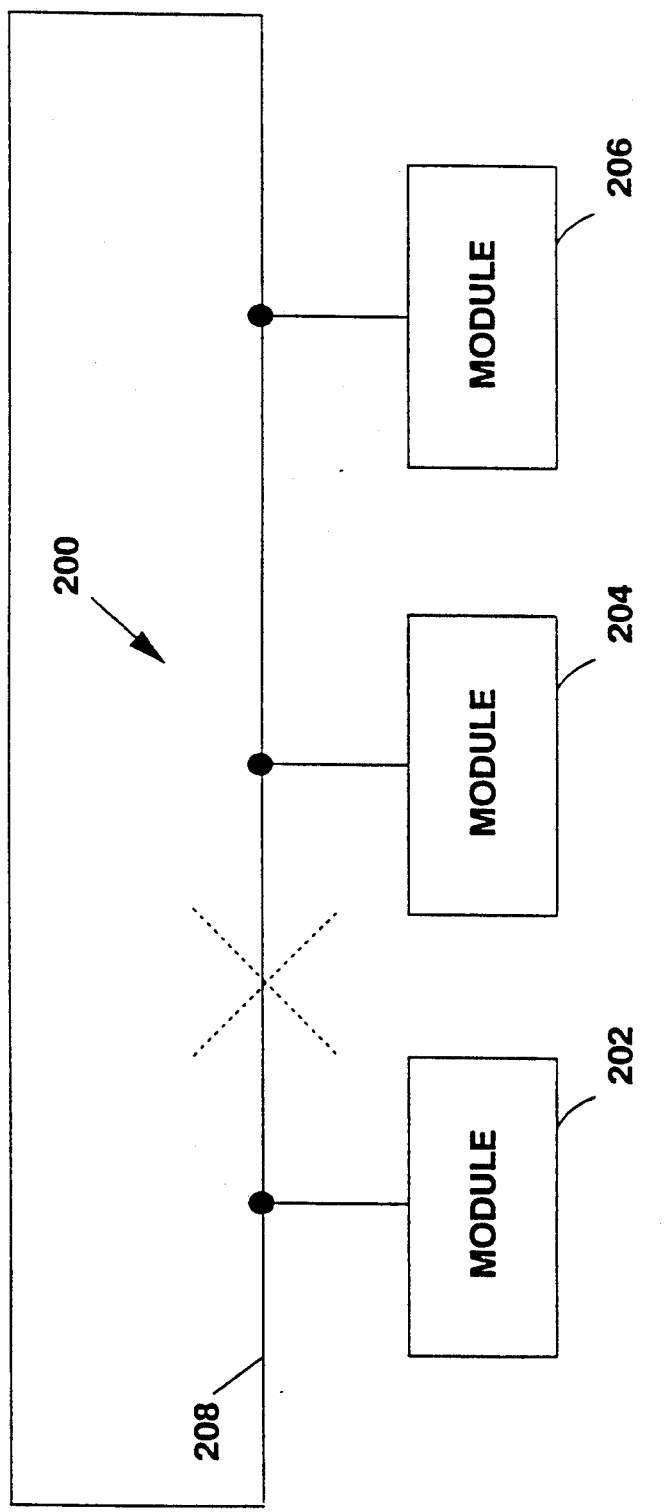
FIG. 2 is a block diagram of a ring bus network as known in the prior art.
Figure 3:
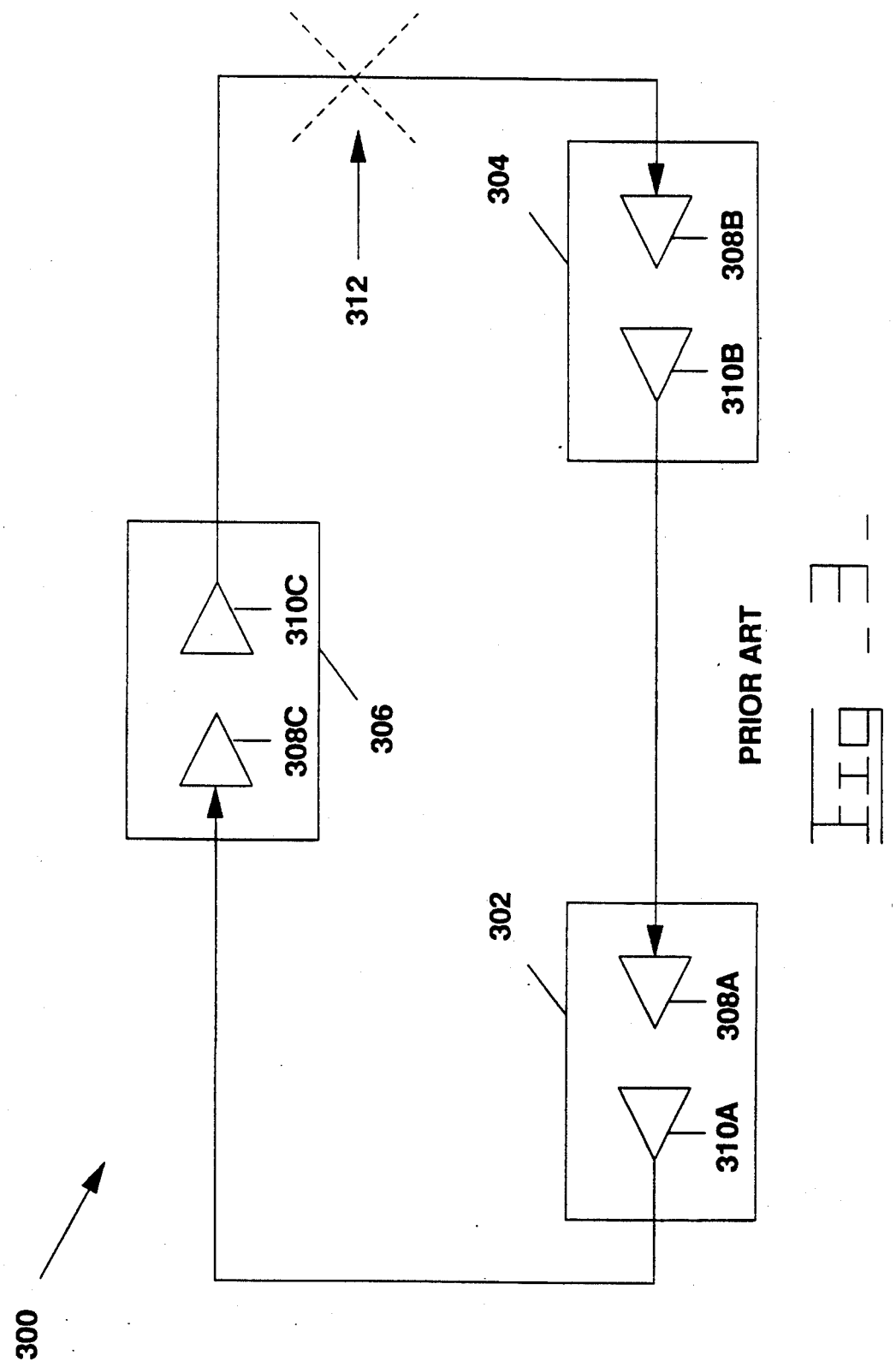
FIG. 3 is a block diagram of a communications network having control modules connected in a ring by a transmitter-receiver pair, as known in the prior art.
Figure 4:
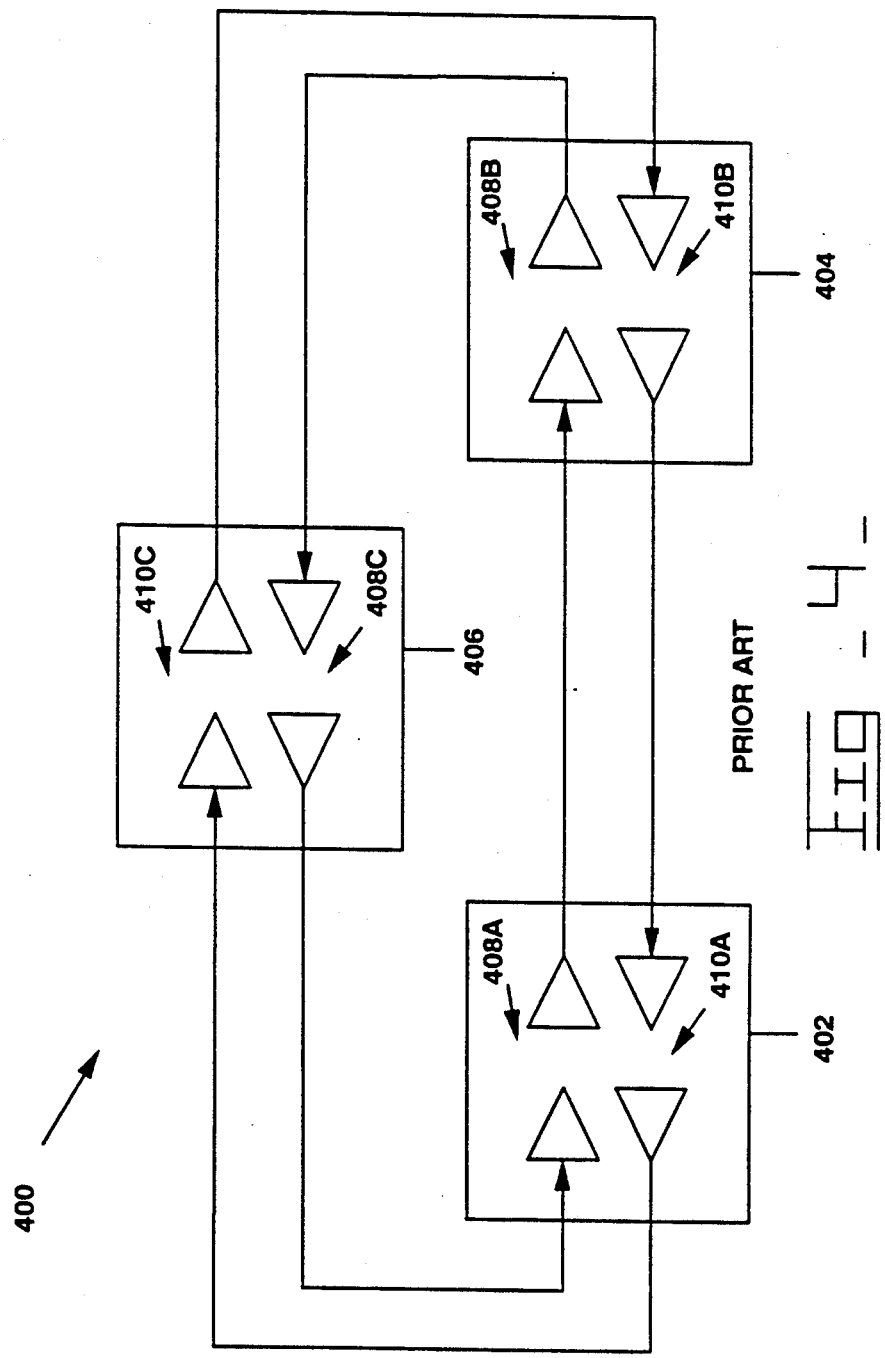
FIG. 4 is a block diagram of a redundant ring network as known in the prior art.
Figure 5:
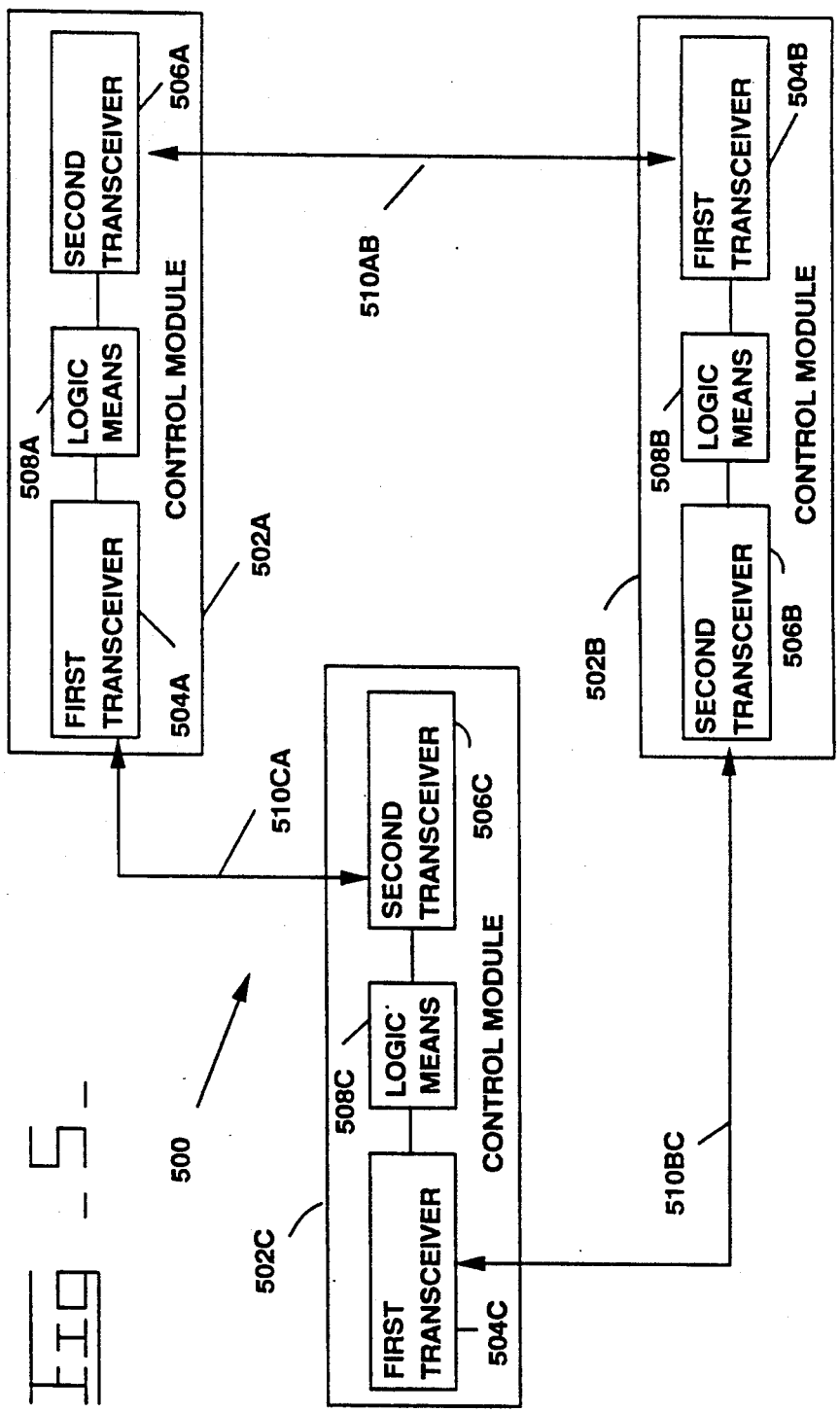
FIG. 5 is a block diagram of a communications network according to the present invention having a plurality of control modules in a ring network, each having a pair of transceivers.

With reference to FIG. 5, the present invention is adapted to provide communication between three control modules 502A,502B,502C connected in a network 500 on a vehicle (not shown). Each control module 502A,502B,502C has a first transceiver (transmitter/receiver pair) 504A,504B,504C and a second transceiver 506A,506B,506C. The control modules 502A,502B,502C may have varying functions, which are immaterial to the present invention. The control modules 502A,502B,502C include logic means 508A,508B,508C which generate and receive data messages. The data messages generated by one control module 502A,502B,502C are transmitted to the other control modules 502A,502B,502C by the first and second transceivers 504A,506A,504B,506B,504C,506C. The control modules 502A,502B,502C are connected in a ring with the first transceiver 504A,504B,504C of each control module 502A,502B,502C connected to the second transceiver 506A,506B,506C of the previous control module 502A,502B,502C in the network 500 and the second transceiver 506A,506B,506C of each control module 502A,502B,502C connected to the first transceiver 504A,504B,504C of the next control module 502A,502B,502C in the network 500. A single transmission line 510AB,510BC,510CA connects each first transceiver 504A,504B,504C to the respective second transceiver 506A,506B,506C. The transmission lines 510AB,510BC,510CA, in the preferred embodiment, are twisted wire pairs.

The data messages are fixed format serial bit streams. Typically, each data message begins with a Message Identification (MID) character; followed by one or more parameters. Each parameter begins with a Parameter Identification (PID) character followed by one or more parameter data characters. The data message ends with a checksum character. Each character has a start bit, 8 bits of data, and a stop bit. Alternately, the MID character could be replaced by a Source Identification (SID) character and a Destination Identification (DID) character.

Figure 6:
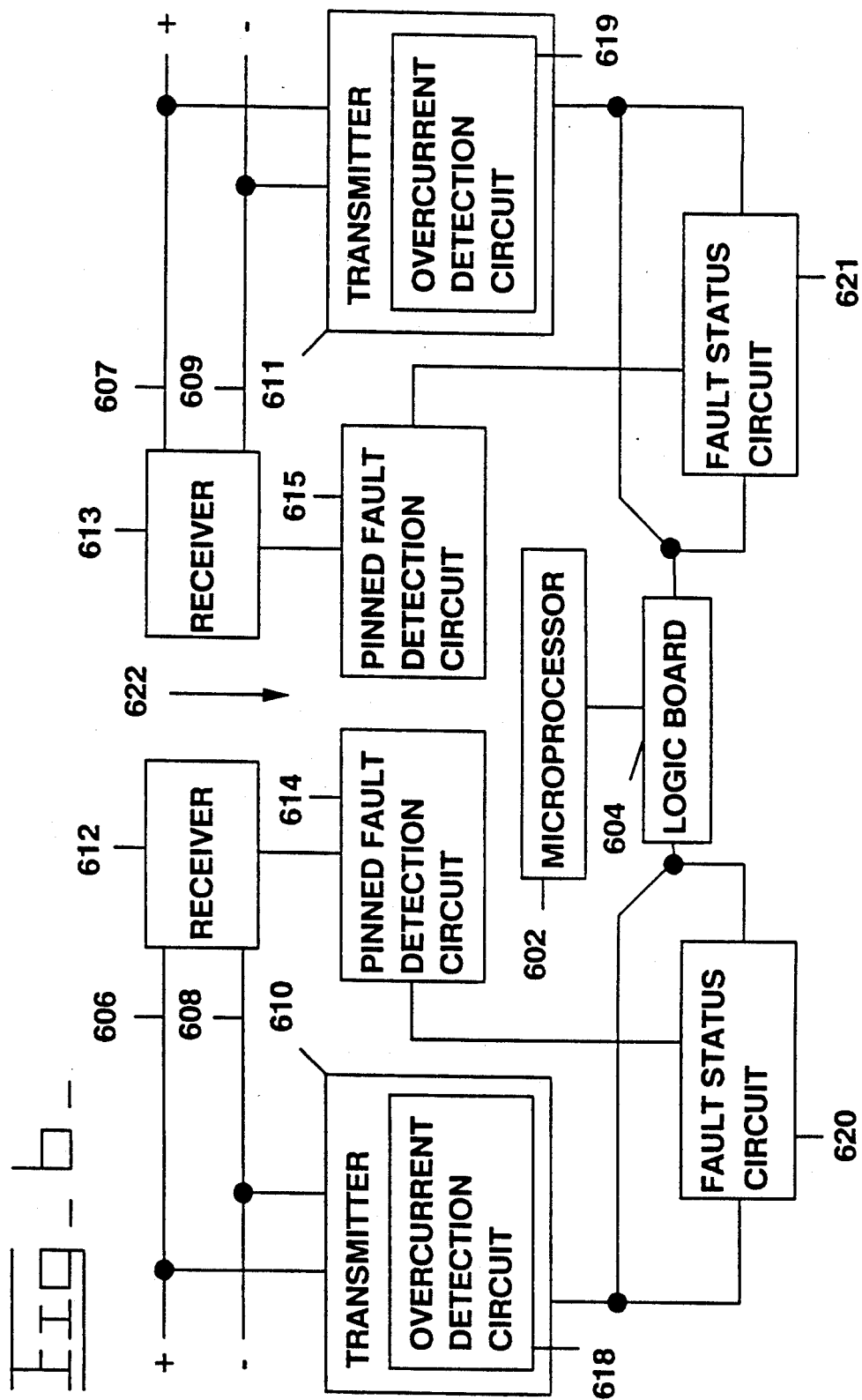
FIG. 6 is a block diagram of one control module of FIG. 5 having a microprocessor and a logic board.

With reference to FIG. 6, a functional block diagram of one logic means 508 is shown. The logic means 508 includes a microprocessor 602 and a logic board 604. The first and second transceivers 504,506 are shown as separate first and second transmitters 610,611 and first and second receivers 612,613. In the preferred embodiment, the microprocessor 602 is adapted to perform a complex function, for example, controlling the solenoids of a fuel injection engine. The microprocessor 602 may receive information from a variety of sensors (not shown) to perform its specified function. The logic board 604 controls the flow of data messages to and from the microprocessor 602.

With reference to one control module 502, the transmission line 510 connected to the first transceiver 502 includes a first positive transmission wire 606 and a first negative transmission wire 608. The transmission line 510 connected to the second transceiver 504 includes a second positive transmission wire 607 and a second negative transmission wire 609. Logic level "HI" is defined to exist when there is a positive 0.2 voltage differential between the positive transmission wire 606,607 and the negative transmission wire 608,609. A logic level "LO" is defined to exist when there exists a negative 0.2 voltage differential between the positive transmission wire 606,607 and the negative transmission wire 608,609. The positive and negative transmission wires 606,608,607,609 form a pair of balanced transmission wires, i.e., the line drivers and receivers are constructed such that the wires in each transmission pair have matched impedances. A second feature of the transmission lines 510 is that the currents in the positive and negative transmission wires 606,608,607,609 are substantially equal in magnitude and opposite in direction.

A second convention used is that the idle or inactive state of the transmission lines 510 is logic level "HI" (the IDLE state). In addition, the first and second transceivers 504,506 are designed such that a logic "LO" signal dominates, i.e., if two transceivers 504,506 are attempting to transmit on a transmission line 510 at the same time, the transmission line 510 always assumes the "LO" state any time either transceiver 504,506 transmits a "LO". Logic level "LO" is therefore said to be the DOMINANT state. In order for one control module 502A,502B,502C to properly detect the start of data messages transmitted from another control module 502A,502B,502C, it is therefore necessary that the first or start bit of each data character is a logic level "LO".

A short circuit detecting means 622 detects the presence of short circuit conditions on the transmission lines 510AB,510BC,510CA. First and second pinned fault detection means 614,615 associated with the first and second receivers 612,613, respectively, sense when the respective transmission line 510 is shorted in the DOMINANT state, i.e., the positive transmission wire 606 is shorted to electrical ground or the negative transmission wire 608 is shorted to supply voltage.

First and second overcurrent detection means 618,619 protect the control module 502 from large currents on the positive and negative transmission wires 606,608,607,609, i.e., the positive transmission wire 606,607 is shorted to supply voltage, the negative transmission wire 608,609 is shorted to electrical ground, or the positive and negative transmission wires 606,608,607,609 are shorted together. Fault status circuits 621,622 relay the presence of a pinned fault or overcurrent condition to the logic board 604.

Figure 7:
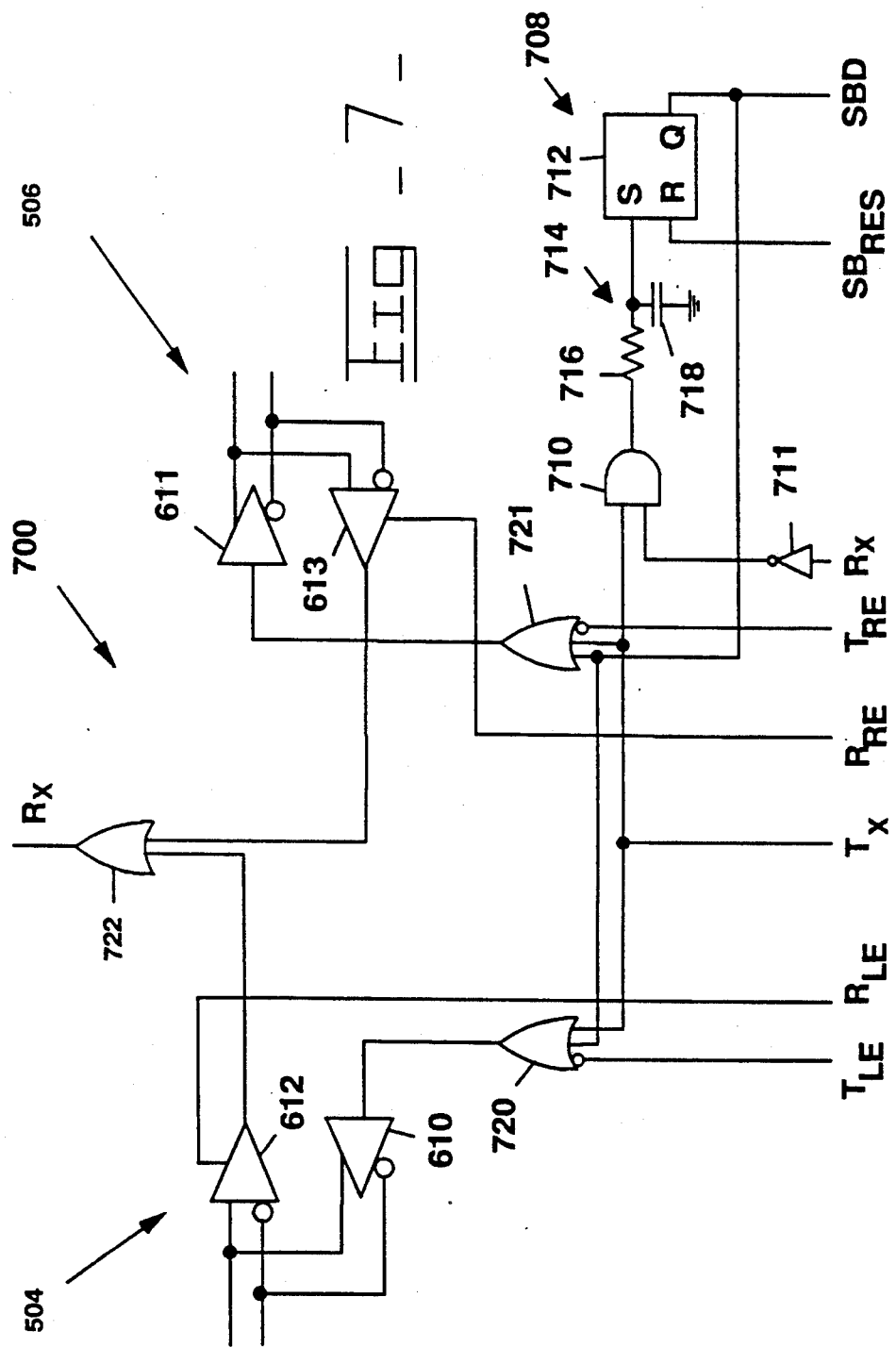
FIG. 7 is a functional logic diagram of the logic module of FIG. 4.

With reference to FIG. 7, the basic digital logic circuit 700 found on the logic board 504 is shown. Serial data to be transmitted is received from the microprocessor 602 (shown as signal $T_X$) and passed to the first and second transmitters 610,611 through second and third logic gates 720,721. The output of the first and second receivers 612,613 is relayed to the microprocessor 602 though a fourth logic gate 722 (signal $R_X$).

The logic circuit 700 includes a means 708 for detecting if a data message is present on the transmission line 510. Signal $R_X$ is connected to a first logic gate 710 through an inverter 711. The first logic gate 710 compares the signals $R_X$ and $T_X$ and is connected to a flip-flop 712 by a lowpass filter 714. The lowpass filter 714 includes a resistor 716 and a capacitor 718. The flip-flop 712 is connected to the microprocessor 602 and signals the microprocessor 602 when a data message from another control module 502 is being received (signal SBD). The microprocessor 602 resets the flip-flop 712 by signal $SB_{RES}$.

The microprocessor 602 controls the first and second transceivers 504,506 through the logic circuit 700 by signals $T_{LE}$, $R_{LE}$, $T_{RE}$, $R_{RE}$. Through these signals, the microprocessor 602 can disable either transmitter 610,611 (signals $T_{LE}$, $T_{RE}$) and/or either receiver 612,613 ($R_{LE}$, $R_{RE}$).

When no data messages are being transmitted or received by any control module 502, both transmission lines 510 are in the passive or "HI" state, as described above. If a control module 502 needs to transmit a data message, the microprocessor 602 checks signal SBD. The microprocessor 602 delays transmission of the data message for a period of time equal to an idle time period plus a priority time period after the detecting means 708 detects the absence of another data message. Preferably, the idle time period is equal to the time required to transmit a character of data, i.e., ten bit times. The priority time period is different for each module and prioritizes each module such that, after the transmission of a data message, no module will attempt to transmit simultaneously. Then the control module 502 attempts to transmit the data message simultaneously in both directions through the first and second transceivers 504,506.

Figure 8A:
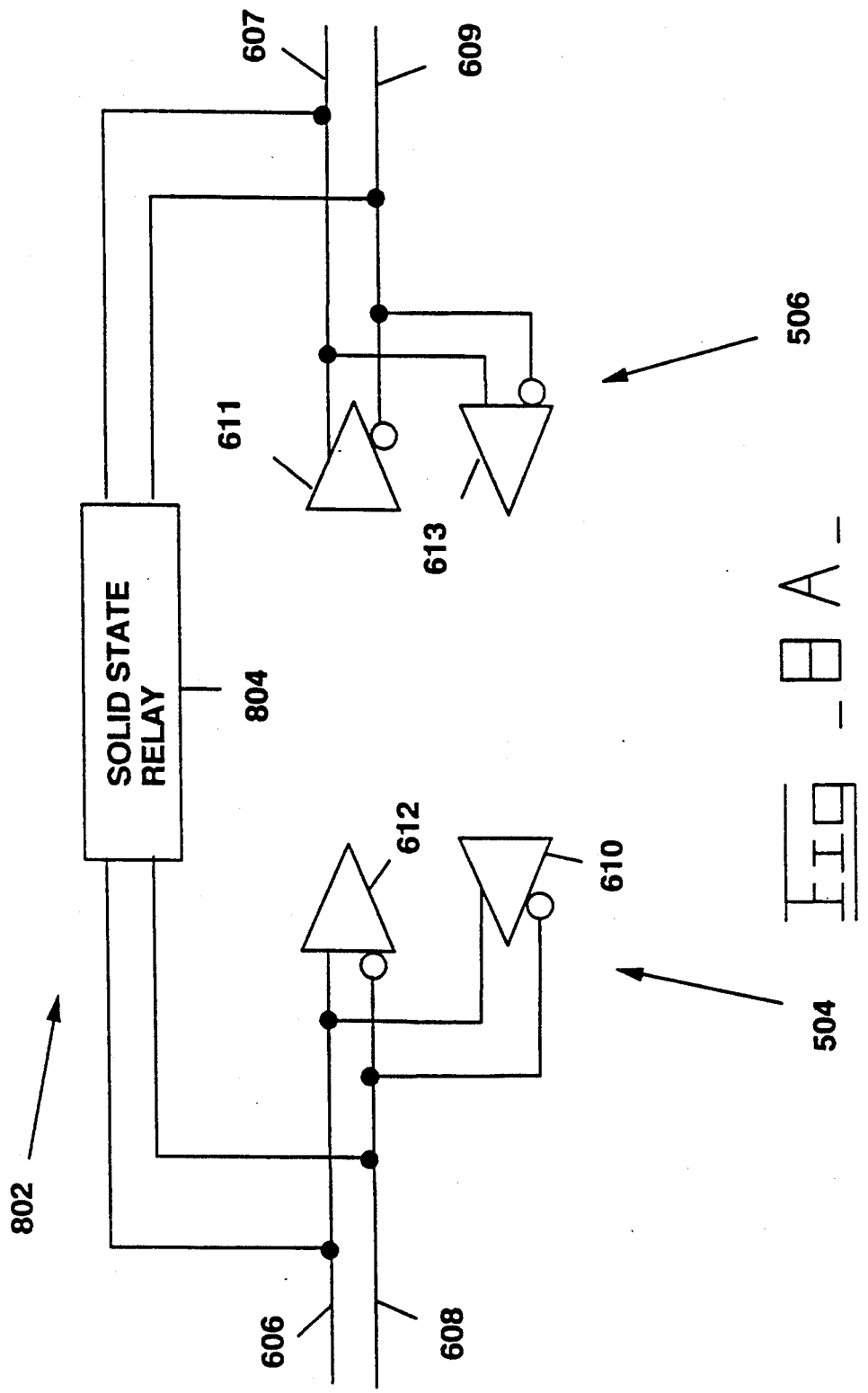
FIG. 8A is a block diagram of the transceivers of one control module showing a first embodiment of a pass-through means.

Referring to FIGS. 8A and 8B, a data message received by either the first or second receiver 612,613 of one control module 502 is relayed to the next control module 502 by a pass-through means 802. In this way, the data message is propagated from control module 502 to control module 502.

In one embodiment, the pass through means 802 includes a solid state relay 804, as shown in FIG. 8A. One suitable relay, part no. LH1061AB, is available from AT&T Technologies INC, a subsidiary of American Telephone & Telegraph CO, located in Berkeley Hts, N.J. The relay 804 is connected across the control module 502 and is under the control of the microprocessor 602. The relay 804 is normally in the closed state, such that the first positive transmission wire 606 is electrically connected to the second positive transmission wire 607. The same is true for the first and second negative transmission wires 608,609.

A second embodiment of the pass-through means 802 is illustrated in FIG. 8B. First and second pass-through gates 820,822 are connected between the first and second transceivers 504,506. A noninverting input 824 of the first pass-through gate 820 is connected to the output of the first receiver 612. The output of the first pass-through gate 820 is connected to the second transmitter 611. A noninverting input 824 of the second pass-through gate 822 is connected to the output of the second receiver 613. The output of the second pass-through gate 822 is connected to the first transmitter 610. Thus, data messages received by the first transceiver 504 are retransmitted to the next control module 502 by the second transceiver 506. The reverse also holds true.

The first and second pass-through gates 820,822 have first and second inverting inputs 826,828 so that "latch-up" will not occur. "Latch-up" is the situation when the first and second transceivers 504,506 become nonresponsive to subsequent signals after a "LO" (the DOMINANT state) has been received or transmitted.

For example, when a "LO" is received by the first transceiver 504, the output of the first receiver 612 and the first pass-through gate 820 both go "LO". The second transceiver 506 retransmits the "LO" to the next control module 502. If the second receiver 613 is allowed to relay the "LO" back to the first transmitter 610, the first transmitter 610 will retransmit the "LO" and the first receiver 612 will be nonresponsive when the transmission line 510 attempts to go "HI". To prevent the retransmitted "LO" from being relayed back to the first transmitter 610, the output of the first pass-through gate 820 is connected to the inverting input 826 of the second pass-through gate 822. The output of the second pass-through gate 822 is "HI", and therefore the first transmitter 610 becomes nonresponsive to the second receiver 613. A received "LO" by the second transceiver 506 is handled in a similar manner and is therefore not further discussed.

During transmission of a data message originating at the control module 502, "latch-up" must also be prevented. For that purpose, the signal $T_X$ is applied to the second inverting input 828 of the first and second pass-through gates 820,822. When $T_X$ goes "LO", the outputs of the first and second pass-through gates 820,822 go "HI". Therefore, the pass-through gates 820,822 are nonresponsive to any signal from the first and second receivers 612,613.

With reference to FIG. 9, an electrical schematic of the first receiver 612, the first transmitter 610, the first pinned fault detection means 614, the first overcurrent detection means 618, and the first fault status circuit 620 is shown. The schematic for the second receiver 613, the second transmitter 611, the second pinned fault detection means 615, and the second fault status circuit 621 is identical and is therefore not further described. The receiver 612 includes a differential receiver 902. First and second resistors 904,906 connect the first positive and negative transmission lines 606,608 to the negative and positive input terminals of the differential receiver 902, respectively. The output of the differential receiver 902 is the complement logic level of the logic state on the transmission line 510, i.e., "HI" or "LO".

The pinned fault detection means 614 includes a first capacitor 912 connected to the output of the differential receiver 902 at one end and to the fourth logic gate 722 at the other end. The juncture between the first capacitor 912 and the fourth logic gate 722 is connected to ground by a first diode 914 and a fifth resistor 916 connected in parallel. The juncture is also connected to an input of a fifth logic gate 918. A second input of the fifth logic gate 918 is connected to the output of the differential receiver 902.

The transmitter 610 in the preferred embodiment, has a negative line driver 920 and a positive line driver 922.

The negative line driver 920 includes a sixth logic gate 924. The sixth logic gate 924 receives signal $T_X$. A sixth resistor 926 is connected to the output of the sixth logic gate 924 at one end and to the base of a first PNP transistor 928 at the other end. The emitter of the first PNP transistor 928 is connected to the voltage supply, $V_S$, through a seventh resistor 930. The collector of the first PNP transistor 928 is connected to electrical ground through an eighth resistor 932. The collector of the first PNP transistor 928 is also connected to the first negative transmission line 608.

The positive line driver 922 includes a seventh logic gate 934. An input of the seventh logic gate 934 receives signal TX. A ninth resistor 936 is connected to the output of the seventh logic gate 934 at one end and to the base of a first NPN transistor 938 at the other end. The emitter of the first NPN transistor 938 is connected to electrical ground by a tenth resistor 940. An eleventh resistor 942 connects the collector of the first NPN transistor 938 to the voltage supply, $V_S$. The collector of the first NPN transistor 938 is also connected to the first positive transmission wire 606.

The first overcurrent detection means 618 includes a positive overcurrent detection circuit 944 and a negative overcurrent detection circuit 945. The positive overcurrent detection circuit 944 includes a second NPN transistor 946, the base of which is connected to the emitter of the first NPN transistor 938 and the emitter of the second NPN transistor 946 is connected to electrical ground. A twelfth resistor 948 connects the collector of the second NPN transistor 946 to the voltage supply, $V_S$. A second diode 950 is connected between the base of the first NPN transistor 938 and the collector of the second NPN transistor 946. The collector of the second NPN transistor 946 is also connected to an eighth logic gate 952. The negative overcurrent detection circuit 945 includes a second PNP transistor 954, the base of which is connected to the emitter of the first PNP transistor 928 and the emitter of the second PNP transistor 954 is connected to the voltage supply, $V_S$. A thirteenth resistor 956 connects the collector of the second PNP transistor 954 to electrical ground. A third diode 958 connects the collector of the second PNP transistor 954 to the base of the first PNP transistor 928. A fourteenth resistor 960 connects the cathode of the third diode 958 to the voltage supply, $V_S$.

The first fault status circuit 620 includes a logic gate 962. An input of the logic gate 962 is connected to the output of the fifth logic gate 918. A second input of the logic gate 962 is connected to the collector of the second PNP transistor 954 and a third input of the logic gate 962 is connected to the collector of the second NPN transistor 946 through the eighth logic gate 952. A fifteenth resistor 964 is connected between the output of the logic gate 962 and the Reset terminal of a flip-flop 966. A second capacitor 970 connects the Reset terminal of the flip-flop 966 to electrical ground. The flip-flop 966 is under the control of the microprocessor 602 through the Set terminal (signal $F_{RES}$). The output terminal, Q, of the flip-flop 966 is connected to the microprocessor 602 and to the sixth and seventh logic gates 924,934 through a tenth logic gate 968. The tenth logic gate 968 is also responsive to signal $T_{LE}$. An eleventh logic gate 972 is connected to the pinned fault detection means 614, the flip-flop 966 and signal $R_{LE}$.

INDUSTRIAL APPLICABILITY

With reference to the drawings, and in operation the network 500 is adapted for communication between three control modules 502A,502B,502C on an earthmoving vehicle, for example, an excavator or a wheel loader, not shown. The control modules 502A,502B,503C have varying functions. These control modules 502A,502B,502C periodically generate data messages which may be needed by one or more of the other control modules 502A,502B,502C. If no data message is being transmitted by any control module 502, all transmission lines 510 are in the passive or logic level "HI" state.

For example in a typical embodiment, one control module 502A controls the fuel injection of the vehicle's engine. The second control module 502B controls the actuation of the clutches and brakes in an electrohydraulic transmission. The third control module 502C controls the movement/position of the implement (i.e., bucket).

The control modules 502A,502B,502C need to communicate to perform their assigned tasks. The first control module 502A includes a sensor for monitoring the engine's RPM. The second control module 502B may also require the engine's RPM to determine a desired gear ratio. Therefore, the first control module 502A needs to periodically transmit the engine's RPM to the second control module 502B.

To accomplish this, the first control module 502A checks if either of the other control modules 502B,502C is transmitting a data message. This is accomplished through the detecting means 708. The first logic gate 710 compares the signals, $R_X$ and $T_X$. Since no message is being transmitted by the first control module 502A, signal $T_X$ is "HI", the passive state. Therefore the output of the first logic gate 710 will be "HI" only if signal $R_X$ is "LO" (i.e., the second or third control module 502B,502C is transmitting a data message). The lowpass filter 714 eliminates any high frequency transients in the output of the first logic gate 710. When the output of the first logic gate 710 goes "HI", the flip-flop 712 will be "set" (i.e., the flip-flop's output, Q, and signal SBD go "HI"). After signal SBD goes "HI", the microprocessor 602 of the first control module 502A delays transmission of the data message containing the engine's RPM for at least ten bit times, the time required to transmit one character of data. At that time, the first control module 502A attempts to transmit the data message again, until it is successful, i.e., the other control module 502B,503C is done transmitting.

While the first control module 502A is transmitting its data message, the second control module 502B receives the data message from the first transceiver 504B and passes the data message to the third control module 502C by the pass-through means 802, as described above. The data message is also transmitted in the other direction by the first transceiver 504A of the first control module 502A. The second transceiver 506C of the third control module 502C receives the data message and passes the data message to the second control module 502B. The second and third control modules 502B,502C also decode the data and determine if the data is intended for them through the Message Identification character (MID).

The chance occurrence that two control modules 502A,502B,502C will transmit data messages simultaneously is also eliminated by the detecting means 708.

The first logic gate 710 compares the transmitted signal and the received signal, $T_X$ and $R_X$. The detecting means 708 signals the microprocessor 602 when the signals are not the same. For example, if the first and second control modules 502A,502B begin to transmit data messages at the same time, both will continue to transmit as long as $T_X$ and $R_X$ are the same. However, if the first control module 502A attempts to transmit a "HI" while the second control module 502B is transmitting a "LO", the microprocessor 602 of the first control module 502A will halt transmission of its data message and wait in the same manner as described above. Signal SBD is also fed into the second and third logic gates 720,721 to disable the first and second transmitters 610,611 of the first control module 502A. Since the "HI" transmitted by the first control module 502A is the passive state of the transmission lines, the transmission lines will assume the "LO" being transmitted by the second control modules 502B. Therefore, the second control module 502B can continue to transmit its data message because the integrity of its transmission has not been interrupted.

If the first differential receiver 902 is receiving valid data, the output of the differential receiver 902 is the logic complement of the state of the transmission line 510 (an additional logic gate can invert this signal before it reaches the microprocessor 602 or the microprocessor 602 can invert the data). Since the voltage potential across the capacitor 912 cannot change instantaneously, the voltage across the fifth resistor 916 follows the output of the differential receiver 612. If the positive and negative transmission lines 606,608 are shorted in the DOMINANT state, the output of the differential receiver 612 remains "HI" for a period of time great enough to charge the first capacitor 912. The voltage potential across the fifth resistor 916 will fall as the voltage potential across the first capacitor 912 rises. Therefore the inputs of the fifth logic gate 918 will be opposite and the output of the fifth logic gate 918 will go "HI", triggering the first fault status circuit 620.

The first overcurrent detection means 618 includes the positive overcurrent detection circuit 944 and the negative overcurrent detection circuit 945, as described above. If the positive transmission line 606 is shorted to the supply voltage $V_S$, the magnitude of the current flowing through the tenth resistor 940 increases. The voltage potential across the tenth resistor 940 is linearly proportional to the magnitude of the current flowing through the tenth resistor 940. When the voltage potential across the tenth resistor 940 reaches a predetermined value, the second NPN transistor 946 switches to the conducting state and the voltage potential across the twelfth resistor 948 increases. The input of the eighth logic gate 952 becomes low, triggering the first fault status circuit 620. If the negative transmission line 608 is shorted to electrical ground, the magnitude of the current flowing through the seventh resistor 930 increases. The voltage potential across the seventh resistor 930 is linearly proportional to the magnitude of the current flowing through the seventh resistor 930. When the voltage potential across the seventh resistor 930 reaches a predetermined value, the second PNP transistor 954 switches to the conducting state and the voltage potential across the thirteenth resistor 956 increases, triggering the first fault status circuit 620. If the first positive and negative transmission wires 606,608 are shorted together one or both of the positive and negative overcurrent detection circuits 944,945 will trigger the first fault status circuit 620.

In this manner, the first fault status circuit 620 relays to the microprocessor 602 the presence of a short circuit on the first positive and negative transmission wires 606,608. The microprocessor 602 protects the circuit by disabling the first receiver 612 and the first positive and negative line drivers 920,922 (signals $T_{LE}, R_{LE}$). The second receiver 613 and the second positive and negative line drivers 921,923 in the control module 502A,502B,502C on the other side shorted transmission wires 606,608 are disabled in the same manner. Data messages are transmitted around the network 500 in the other direction, bypassing the disabled receivers/transmitters 612,613,920,921,922,923.

Transmission between all of the control modules 502A,502B,502C can also be accomplished when a break occurs in the transmission line 510AB,510BC,510CA between two of the control modules 502A,502B,502C. The receivers/transmitters 612,613,920,921,922,923 associated with the faulted transmission line 510AB,510BC,510CA are disabled and data messages are transmitted around the network in the other direction, bypassing the disabled receivers/transmitters 612,613,920,921,922,923. The presence and location of the broken transmission line 510AB,510BC,510CA is determined in the following manner. The first control module 502A (the assignment of this function is arbitrary) periodically disables the first transmitter 610 and transmits a data message around the network in one direction using the second transmitter 611. If the data message returns to the first control module 502A and is received by the first receiver 612, then no break has occurred. If the data message does not return, a break in one of the transmission lines 510AB,510BC,510CA has occurred. Then the first control module 502A requests that every other control module 502B,502C transmit a data message in turn. By monitoring if the data message transmitted by each control module 502B,502C is received by the first or second transceiver 504,506, the location of the break can be determined. For example, if a break occurs between the first and second control modules 502A,502B, the data message transmitted by the second control module 502B AND the data message transmitted by the third control module 502C will both be received by the second transceiver 504A of the the first control module.

A display (not shown) on the vehicle may indicate to an operator that a fault has occurred and the location of the fault. The outputs of the first and second pinned fault detection means 614,615, and the first positive and negative overcurrent detection circuits may be connected to the microprocessor 602, such that the microprocessor 602 can determine not only the presence and location of a fault, but also the type of fault present on the transmission lines 510AB,510BC,510CA.

We claim:
1. A communications network, comprising:
a plurality of control modules, each having first and second transceivers, said first transceiver of each control module being connected to the second transceiver of another control module by only a single transmission line, forming a composite ring network, each control module being adapted to transmit data messages to the other control modules over said transmission lines;
wherein said control modules include detecting means for sensing the presence of a first data mes- sage on said network and producing a message signal in response thereto; and logic means for producing a second data message at one control module, receiving said message signal and permitting transmission of said second data message simultaneously through both first and second transceivers of said one control module of said network in the absence of said message signal.

2. A communications network, as set forth in claim 1, wherein said logic means inhibits transmission of said second data message for a predetermined period of time after receiving said message signal.

3. A communications network, as set forth in claim 1, including means for sensing the simultaneous transmission of data messages from at least two control modules and delivering a collision signal in response thereto, and wherein said logic means inhibits transmission of said data messages from all but one control module in response to receiving said collision signal.

4. A communication network, as set forth in claim 1, wherein each control module includes pass-through means for receiving said second data message from a previous control module and relaying said second data message to a next control module.

5. A communications network, as set forth in claim 4, wherein said pass-through means includes a solid state relay.

6. A communications network, as set forth in claim 4, wherein said pass-through means includes a logic circuit connected to and between said first and second transceivers.

7. A communications network, as set forth in claim 1, wherein each transceiver includes a receiver, a positive line driver and a negative line driver, the positive line driver of said first transceiver of each control module being connected to the receiver of said second transceiver of another control module by a positive transmission wire, the negative line driver of said first transceiver of each control module being connected to the receiver of said second transceiver of said another control module by a negative transmission wire.

8. A communications network, as set forth in claim 7, including short circuit sensing means associated with each transceiver for detecting a short circuit condition on either of said positive and negative transmission wires and wherein each control module disables said transceiver associated with said detected short circuited transmission line.

9. A method for transmitting a data message around a bidirectional communication network, said network having a plurality of control modules having first and second transceivers and being sequentially connected in a ring by transmission lines, wherein a single transmission line connects said first transceiver of each control module to said second transceiver of another control module, forming a composite ring network, comprising the steps of:

detecting the presence of a first data message on said network;

producing a second data message at one control module; and, transmitting said second data message simultaneously from said first and second transceivers of said one control module in the absence of said first data message.

10. A method, as set forth in claim 9, wherein the other control modules relay said second data message around said network.

11. A method, as set forth in claim 9, including the step of inhibiting the transmission of said second data message from said one control module for a predetermined period of time after detecting said first data message.

12. A method, as set forth in claim 10, including the steps of:

sensing the simultaneous transmission of unique data messages from at least two control modules; and, inhibiting the transmission of said unique data messages from all but one control module.

13. A method, as set forth in claim 11, wherein each transceiver includes a receiver, a positive line driver and a negative line driver, the positive line driver of said first transceiver of each control module being connected to the receiver of said second transceiver of another control module by a positive transmission wire, the negative line driver of said first transceiver of each control module being connected to the receiver of said second transceiver of said another control module by a negative transmission wire, and including the steps of:

detecting a short circuit condition on any of said positive and negative transmission wires; and, disabling each transceiver associated with said short circuited condition.

* * * * *